UNITED STATES PATENT OFFICE.

ARTHUR G. HARRIS, OF LANCASTER COUNTY, NEBRASKA.

COMPOSITION OF MATTER.

1,063,792.     Specification of Letters Patent.     Patented June 3, 1913.

No Drawing.     Application filed November 29, 1910. Serial No. 594,634.

*To all whom it may concern:*

Be it known that I, ARTHUR G. HARRIS, a citizen of the United States, and a resident of the county of Lancaster and State of Nebraska, have made certain new and useful Improvements in Compositions of Matter, of which the following is a specification.

My invention relates to improvements in compositions of matter, and it consists in the several ingredients hereinafter named whch are united in the proportions specified.

An object of my invention is to provide a composition of matter which shall be of the nature of concrete, but which has many marked advantages over the latter, among which may be mentioned that of strength, *i. e.*, resistance to compression or tension, resiliency or capability of withstanding shocks or vibrations, ability to deaden sound vibrations, extreme noncombustibility, relatively light weight, and a beautiful appearance when the product is to be used for building purposes.

The particular merits of the product which have been just mentioned, will be set forth at length hereinafter.

In carrying out my invention, I make use of a rock known as serpentine, which is a form of hydrous magnesium silicate, and which belongs to the class of minerals known generally as horn blende. In preparing this composition of matter, I first break up this rock into lumps, which may vary from the size of small pebbles to pieces of larger size—say up to one inch in diameter. The other ingredients of this new composition of matter are Portland cement, and some form of a light filler, such as cinders. This composition, it will be seen, is in the nature of a concrete, but, as stated above, and as will be shown more particularly later, it has properties which distinguish it greatly from the ordinary concrete.

My product can be made with varying proportions of the ingredients, these proportions depending upon the particular use to which the product is to be put. As an example, however, of an efficient combination I may use serpentine, two parts, cinders, one part, and Portland cement, two parts. These substances are mixed in the ordinary way, water is added, and the cement is allowed to set. Another formula may be one part cement, two parts cinders, and three parts serpentine. Either of these formulæ result in a product having many advantages over the ordinary concrete. In the first place the strength of the product is enormously increased. In a test of the substance at the State University of Nebraska on a Rehle testing machine, the following result was obtained: A mixture made according to the second formula given above, and which had aged for eighteen days, was placed in a machine and withstood a pressure of 4100 pounds per square inch, before failure. This one instance will suffice to show the enormous increase in the strength of the product over that of the ordinary concrete formed of sand, gravel, and cement. Other tests, however, give just as good results in regard to the tensile strength of the product, which is far in excess of that of ordinary concrete.

One of the most important properties of my improved product is the property of resistance to shock or vibration. Under repeated blows ordinary concrete shatters, but my product is resilient, and will not disintegrate under blows or vibrations which would cause ordinary concrete to disintegrate. It is, therefore, applicable to many uses where it is subject to hard blows or vibrations such as footings for heavy machinery, floors for warehouses and other structures, and especially for use as cross ties for railways.

The improved product is especially desirable for use as a sound deadener. It differs greatly from the ordinary concrete in that the latter, which generally has sand as an ingredient, transmits sound very readily. The effect of the serpentine is to render the product under consideration a nonconductor of sound, so that its use as a sub-flooring or for walls, or for any purpose, where it is desirable to shut off sound, is especially advantageous. It does not absorb water as readily as does the ordinary concrete, although it is lighter than the ordinary concrete. It is fire proof up to the point of fusibility of the cement. I mean by this that it may be heated without causing the disintegration of the product. Ordinary concrete cannot be so treated without disintegration. The reason for this property of resisting heat without disintegration is because of the fact that the coefficient of expansion of the serpentine, which forms one of the main ingredients is so nearly that of the finished product.

The ordinary concrete does not present a pleasing appearance when it is in the rough, but the product which forms the subject of this application, on the other hand, does present a pleasing appearance. It resembles a natural conglomerate rock, the pieces of serpentine and the cinders forming a pleasing contrast to the gray appearance of the cement.

From the foregoing description, it will be seen that I have produced a product having marked advantages over the ordinary concrete. These marked advantages arise from the use of the serpentine in connection with the cement and cinders. The reason for the increased strength of the product may be accounted for by the fact that the serpentine is hydrous, and when it is incorporated with the cement it is readily dehydrated, and gives up to the cement its water of hydration. This water of hydration should not be confounded with "water of crystallization." It is water which is held in suspension by the rock. Neither is it water which can be taken up by merely placing the rock in water. This water of hydration exists as such throughout the entire body of the rock, and is entirely independent of any contact with water outside of the body of the rock. It always accompanies the serpentine and comprises about 13½% of the mass of the latter. It is this water which is given up to the cement while the latter is setting. The serpentine does not give up all of the water to the cement, but nearly all of it will be absorbed by the latter in a reasonable time and easily during the process of the setting of the cement. This results in strengthening the product to a marked degree. The serpentine, it must be remembered, is in the form of lumps. It is not crushed to a powder. Notwithstanding this fact, when the product is broken open, the serpentine will be found to have absorbed the cement within its interior. Under the microscope, the crystals of cement can be plainly seen within the particles or lumps of serpentine. Now, a concrete composed of sand, gravel, and cement, exhibits no such peculiarity, that is, the gravel or sand will not be penetrated by the cement. Serpentine is practically infusible and does not disintegrate on exposure to air or natural elements. It retains its angular lump form and even increases in hardness as it dehydrates. It does not disintegrate on exposure to sudden reversal of extreme temperatures, as does sand or gravel, but remains practically morbid even when heated to a high temperature and sprayed with cold water, the above being true both in the raw serpentine, and in the finished product which forms the subject of the present application. Another feature of the serpentine is that when it is broken or crushed, it always breaks with sharp edges, and no matter how it is abraded there are no round corners. This contributes to the strength of the product.

It will be noted that I have spoken entirely of the physical properties of the serpentine. These physical properties are lacking in certain forms of minerals, which have a somewhat similar chemical composition. The use of asbestos for instance as an ingredient of concrete, would not at all fulfil the requirements in my product. It is true that the fibers of the asbestos might form a binder similar to the action of hair in mortar, but the serpentine does not act in this way. The main purpose of the serpentine, is, as stated, to supply the cement with additional water, while it is setting. Certain kinds of horne-blende, upon whose chemical composition the resulting product depends, would not at all fulfil the requirements, which are fulfilled by the serpentine.

It will be seen from the foregoing description that the serpentine possesses numerous qualities which tend to the production of a product of superior quality.

The serpentine and cement can be used alone, but for certain purposes it is better to combine with these two substances, a filler, such as cinders. This adds to the lightness of the product without decreasing its strength.

It will be understood that by the use of the term "hydrous" in the appended claims, applicant refers to that condition of the rock in which the water is held in suspension, as explained heretofore.

I claim:

1. The herein described composition of matter which consists of cement, lumps of hydrous magnesium silicate capable of giving up its water to the cement when the latter is setting, and having a relatively small coefficient of expansion, and a filler.

2. The herein described composition of matter which consists of cement, lumps of an infusible hydrous rock capable of giving up its water to the cement when the latter is setting, and having a relatively small coefficient of expansion, and a filler.

3. The herein described composition of matter which consists of cement, and lumps of hydrous serpentine capable of giving up its water to the cement when the latter is setting, all the corners of said lumps being sharp.

4. The herein described composition of matter which consists of cement, and lumps of hydrous magnesium silicate capable of giving up its water to the cement when the latter is setting, all the corners of said lumps being sharp.

5. The herein described composition of matter which consists of cement, lumps of infusible hydrous magnesium silicate capable of giving up its water to the cement when the latter is setting and having relatively small coefficient of expansion.

6. The herein described composition of matter, which consists of cement, lumps of hydrous serpentine capable of giving up its water to the cement when the latter is setting, and a filler.

ARTHUR G. HARRIS.

Witnesses:
L. A. STANLEY,
SOLON C. KEMON.